(12) United States Patent
Liu

(10) Patent No.: US 10,877,775 B2
(45) Date of Patent: Dec. 29, 2020

(54) METHOD AND SYSTEM FOR KEY VALUE EXTENDING

(71) Applicant: SHENZHEN TCL DIGITAL TECHNOLOGY LTD., Guangdong (CN)

(72) Inventor: Jiangjun Liu, Guangdong (CN)

(73) Assignee: SHENZHEN TCL DIGITAL TECHNOLOGY LTD., Shenzhen (CN)

(*) Notice: Subject to any disclaimer, the term of this patent is extended or adjusted under 35 U.S.C. 154(b) by 228 days.

(21) Appl. No.: 16/310,807

(22) PCT Filed: Jun. 4, 2016

(86) PCT No.: PCT/CN2016/084852
§ 371 (c)(1),
(2) Date: Dec. 17, 2018

(87) PCT Pub. No.: WO2017/181501
PCT Pub. Date: Oct. 26, 2017

(65) Prior Publication Data
US 2019/0196847 A1    Jun. 27, 2019

(30) Foreign Application Priority Data
Apr. 19, 2016    (CN) .......................... 2016 1 0244821

(51) Int. Cl.
*G06F 15/177*    (2006.01)
*G06F 9/00*    (2006.01)
(Continued)

(52) U.S. Cl.
CPC ............ *G06F 9/44505* (2013.01); *G06F 9/44* (2013.01); *G06F 16/958* (2019.01); *H04N 5/445* (2013.01)

(58) Field of Classification Search
CPC ...... G06F 9/44505; G06F 9/44; G06F 16/958; G06F 8/76; H04N 5/445
See application file for complete search history.

(56) References Cited

U.S. PATENT DOCUMENTS 6,789,156 B1    9/2004    Waldspurger
8,285,925 B1    10/2012    Sorenson, III et al.
(Continued)

FOREIGN PATENT DOCUMENTS

CN    102033578 A    4/2011
CN    102790918 A    11/2012
(Continued)

OTHER PUBLICATIONS

Extended European Search Report of counterpart European Patent Application No. 16899088.5 dated Dec. 16, 2019.
(Continued)

*Primary Examiner* — Xuxing Chen

(57) ABSTRACT

Disclosed a key value extending method, which comprises: when a browser is started, storing a key value and its mapping value of a loaded first configuration file for initializing a hash mapping table into the hash mapping table, and storing a loaded second configuration file used to define a plurality of key value definitions of the browser into the browser's memory; when a webpage is opened, logging a key value definition that stored in the key value definitions but not found in the webpage into the webpage; and when received a key request from the webpage, searching a mapping value required by the webpage in the hash mapping table according to the key value included in the key request, and returning the searched mapping value to the webpage. This disclosure also discloses a key value extending system.

13 Claims, 5 Drawing Sheets

(51) Int. Cl.
*G06F 9/24* (2006.01)
*G06F 9/445* (2018.01)
*G06F 9/44* (2018.01)
*G06F 16/958* (2019.01)
*H04N 5/445* (2011.01)

(56) References Cited

U.S. PATENT DOCUMENTS

| | | |
|---|---|---|
| 2004/0031041 A1 | 2/2004 | Windheim et al. |
| 2012/0330954 A1 | 12/2012 | Sivasubramanian et al. |
| 2013/0013571 A1 | 1/2013 | Sorenson, III et al. |
| 2014/0372400 A1* | 12/2014 | Ramachandran ..... G06F 16/951 707/706 |
| 2014/0379841 A1 | 12/2014 | Zong et al. |

FOREIGN PATENT DOCUMENTS

| | | |
|---|---|---|
| CN | 102902751 A | 1/2013 |
| CN | 103177095 A | 6/2013 |
| CN | 104067216 A | 9/2014 |
| CN | 104902298 A | 9/2015 |
| CN | 105446709 A | 3/2016 |

OTHER PUBLICATIONS

International Search Report of PCT Patent Application No. PCT/CN2016/084852 dated Jan. 5, 2017.

* cited by examiner

METHOD AND SYSTEM FOR KEY VALUE EXTENDING

TECHNICAL FIELD

The present disclosure relates to the field of television technology, and more particularly relates to a method and a system for key value extending.

BACKGROUND

With the development of Internet technology, embedded browsers are becoming more and more widely used in television and set-top boxes. However, different web applications may have some differences in defining key values, which certainly causes the browser to modify the key definitions in the browser kernel configuration in order to be compatible with these differentiated key values. Thus, different web applications will generate different browser libraries. So that there are many versions of the browser library for the same browser, which is not convenient for software version management.

The above content is only used to assist in understanding the technical solutions of the present application, and does not constitute an admission that the above is prior art.

SUMMARY

The present invention provides a method and a system for key value extending, in order to implement extension of a browser key value without modifying the kernel configuration of the browser.

To achieve the above purpose, the present disclosure provides a key value extending method, the key value extending method includes:

when a browser is started, storing a key value and its mapping value of a loaded first configuration file for initializing a hash mapping table into the hash mapping table, and storing a loaded second configuration file used to define a plurality of key value definitions of the browser into the browser's memory;

when a webpage is opened, logging a key value definition that stored in the key value definitions but not found in the webpage into the webpage, according to the stored key value definitions and existing key value definitions of the webpage; and when received a key request from the webpage, searching a mapping value required by the webpage in the hash mapping table according to the key value included in the key request, and returning the searched mapping value to the webpage.

Optionally, the operation of searching a mapping value required by the webpage in the hash mapping table according to the key value included in the key request, and returning the searched mapping value to the webpage includes:

determining whether the key value exists in the hash mapping table;

determining whether the mapping value defined by the webpage exists in the mapping values of the key value if the key value exists in the hash mapping table; and returning the mapping value that defined by the webpage back to the webpage if the mapping value defined by the webpage exists in the mapping values of the key value.

Optionally, the operation of searching a mapping value required by the webpage in the hash mapping table according to the key value included in the key request, and returning the searched mapping value to the webpage further includes:

if not, returning the default mapping value of the key value back to the webpage.

Optionally, the operation of logging a key value definition that stored in the key value definitions but not found in the webpage into the webpage, according to the stored key value definitions and existing key value definitions of the webpage includes:

determining whether the stored key value definitions exist in the existing key value definitions of the webpage; and logging the stored key value definitions that are not belong to the existing key value definitions of the web page into the webpage.

To achieve the above purpose, the present disclosure further provides a key value extending system, and it includes:

an initializing module, being configured to initialize a hash mapping table according to a specified loading file and store a key value definition to be logged; wherein the hash mapping table comprises key values and mapping values thereof;

a logging module, being configured to log a key value definition that stored in the key value definitions but not found in the webpage into the webpage according to the stored key value definitions and existing key value definitions of the webpage, when a webpage is opened;

a processing module, when received a key request from the webpage, searching a mapping value required by the webpage in the hash mapping table according to the key value included in the key request, and returning the searched mapping value to the webpage.

Optionally, the processing module includes:

a determining unit, being configured to determine whether the key value exists in the hash mapping table;

a first judging unit, being configured to determine whether the mapping value defined by the webpage exists in the mapping values of the key value if there is a key value exists in the hash mapping table; and a first processing unit, being configured to return the mapping value that defined by the webpage back to the webpage if there is a mapping value defined by the webpage exists in the mapping values of the key value.

Optionally, the processing module further includes:

a second processing unit, being configured to return the default mapping value of the key value back to the webpage if there is not a mapping value defined by the webpage exists in the mapping values of the key value.

Optionally, the logging module includes:

a second judging unit, being configured to determine whether the stored key value definitions exist in the existing key value definitions of the webpage; and a logging unit, being configured to log the stored key value definitions that are not belong to the existing key value definitions of the web page into the webpage.

Optionally, the initializing module includes:

a first storing unit, being configured to store a key value and its mapping value of a loaded first configuration file for initializing a hash mapping table into the hash mapping table; and a second storing unit, being configured to store a loaded second configuration file used to define a plurality of key value definitions of the browser into the browser's memory.

In order to achieve the above object, the present disclosure also provides a television set on which the above-described key value extending system is provided.

This application discloses a key value extending method, system and television. Initializing a hash mapping table according to a specified loading file and store a key value definition to be logged; when a webpage is opened, logging a key value definition that stored in the key value definitions but not found in the webpage into the webpage, according to the stored key value definitions and existing key value definitions of the webpage; and when received a key request from the webpage, searching a mapping value required by the webpage in the hash mapping table according to the key value included in the key request, and returning the searched mapping value to the webpage. Although different webpages have different key values defined by the same key, the key values supported by the webpage can be obtained without modifying the browser kernel configuration, thereby correctly responding to the key request, and the compatibility of browser key value is improved on different web pages, which avoids the problem of modifying the browser kernel configuration to cause many versions of the browser library.

BRIEF DESCRIPTION OF THE ACCOMPANYING DRAWINGS

Various implementations, functional features, and advantages of this disclosure will now be described in further detail in connection with some illustrative embodiments and the accompanying drawings.

DETAILED DESCRIPTION OF ILLUSTRATIVE EMBODIMENTS

It is understood that the specific embodiments described herein are merely illustrative of the disclosure and are not intended to limit the disclosure.

Figure 1:
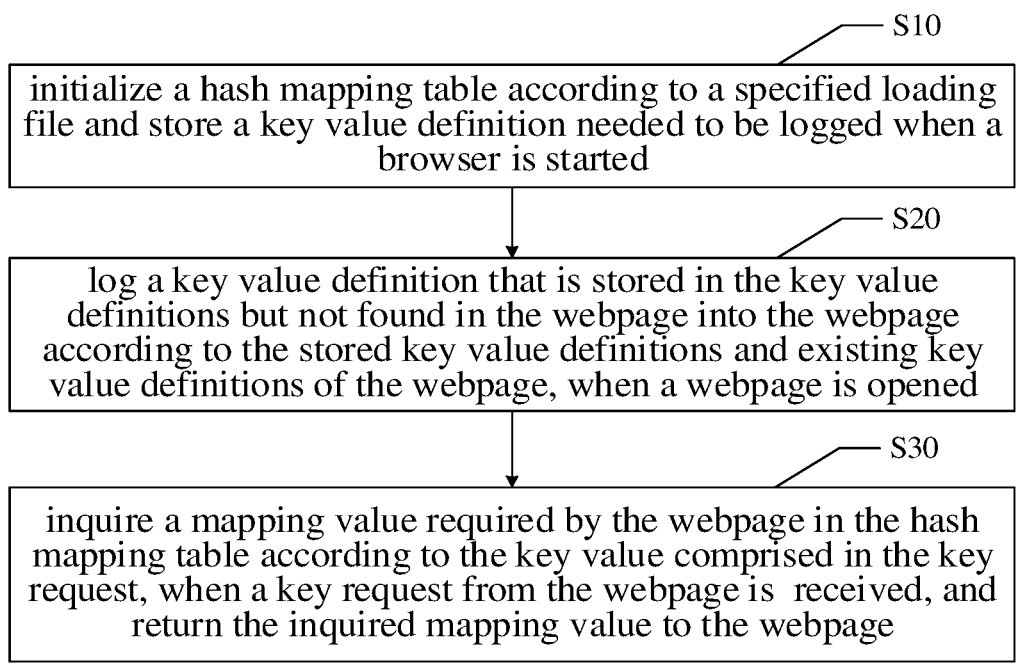
FIG. 1 is an illustrative flowchart of the first embodiment of a method for key value extending in accordance with this disclosure.

The present disclosure provides a method for key value extending. As shown in FIG. 1, it is an illustrative flowchart of the first embodiment of a method for key value extending in accordance with this disclosure. And the key value extending method includes S10 to S30.

In S10, when a browser is started, initializing a hash mapping table according to a specified loading file and store a key value definition to be logged.

The key value extending method can be applied to a television set, and the browser installed on the television is an embedded browser. When the browser on the TV starts up, it needs to load various files, including the file that stores the original key value of the platform and its corresponding webpage definition key value, such as the keymap.ini file, and also includes the injection file, such as the key_inject.js file. The content contained in the injection file is the definition of each key value that needs to be injected.

In this embodiment, the specified load file refers to a keymap.ini file and a key_inject.js file. The TV obtains the hash mapping table by initializing the contents of the keymap.ini file and stores the contents of the key_inject.js file on the television. The hash mapping table includes key values and their mapping values, that is, original platform key values of each platform and their mapped webpage definition key values.

In S20, when a webpage is opened, logging a key value definition that stored in the key value definitions but not found in the webpage into the webpage, according to the stored key value definitions and existing key value definitions of the webpage.

When a webpage is opened on a browser, the television obtains the existing key value definitions of the webpage according to the loaded webpage information. A key value definition is determined through comparing the existing key value definition of the webpage with the stored key value definition, and that the key value is not included in the webpage but included in the stored key value definitions. At this time, the television injects a key value definition that is not included in the stored webpage value into the webpage, so that the webpage is added some key definitions that are not defined. For example, the key value definition var KEYUP=310 indicates that the key value corresponding to the key KEYUP in the webpage is 310.

In S30, when received a key request from the webpage, searching a mapping value required by the webpage in the hash mapping table according to the key value included in the key request, and returning the searched mapping value to the webpage.

When the television receives a key request on the webpage sent by a platform (such as a remote controller or a keyboard), the television searching the mapping value (i.e., the webpage definition key value) from the hash mapping table corresponding to the key value (i.e. the platform original button value) contained in the key request. And determining a mapping value required by the webpage to return to the webpage, so that the webpage response to the keypress event based on the obtained key mapping value to the platform.

The key value extending method proposed by this application initializing a hash mapping table according to a specified load file and stores a key value definition to be injected when the browser is started. And when a webpage is opened, logging a key value definition that stored in the key value definitions but not found in the webpage into the webpage, according to the stored key value definitions and existing key value definitions of the webpage; and when received a key request from the webpage, searching a mapping value required by the webpage in the hash mapping table according to the key value included in the key request, and returning the searched mapping value to the webpage. Although different webpages have different key values defined by the same key, the key values supported by the webpage can be obtained without modifying the browser kernel configuration, thereby correctly responding to the key request, and the compatibility of browser key value is improved on different web pages, which avoids the problem of modifying the browser kernel configuration to cause many versions of the browser library.

Figure 2:
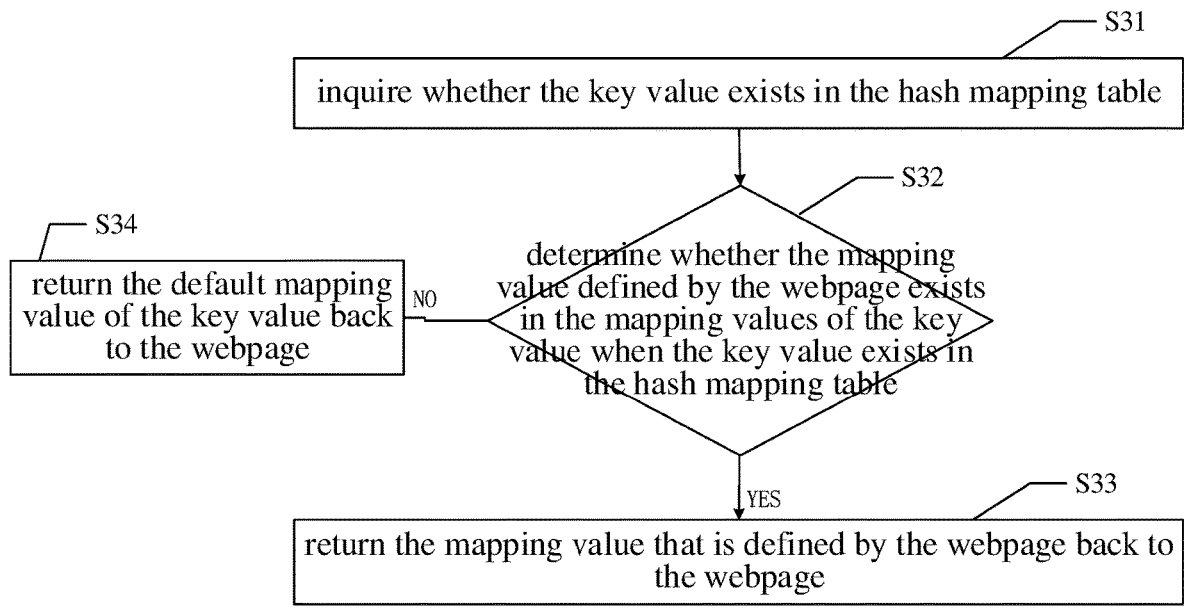
FIG. 2 is a refine flowchart of step S30 in FIG. 1.

Further, a second embodiment of the key value extending method of the present invention is proposed based on the first embodiment. In this embodiment, referring to FIG. 2, the foregoing operation S30 includes following S31 to S33.

In S31, determining whether the key value exists in the hash mapping table.

The key value refers to a platform original key value included in the key request.

In S32, determining whether the mapping value defined by the webpage exists in the mapping values of the key value if the key value exists in the hash mapping table.

The platform original key value for the same key is same. And for different webpages, an original platform key value may be mapped to different webpage definition key values corresponding to different webpages. That is, a key value may have multiple mapping values in the hash mapping table, and these mapping values correspond to webpage definition key values of the same key defined by different webpages.

The television set can obtain the webpage definition key value corresponding to the key value defined by the webpage through the webpage information of the webpage, and then search for the webpage definition key value in mapping values from the hash mapping table, thereby determining whether the mapping value of the webpage definition exists in the mapping value of the key value.

In S33, returning the mapping value that defined by the webpage back to the webpage if the mapping value defined by the webpage exists in the mapping values of the key value.

If the mapping value defined by the webpage exists in the mapping values of the key value, it indicates that the television can convert the platform original key value included in the key request into a webpage definition key value defined by the webpage. After the television returns the mapping value defined by the webpage to the webpage, the webpage can respond correctly to the key request according to the returned mapping value. The entire process of receiving a key request from the television to the webpage in response to the web page does not require the television to modify the browser kernel configuration to enable the webpage to support the correct response to the key request.

Further, the above S30 further includes S34.

In S34, returning the default mapping value of the key value back to the webpage if the mapping value defined by the webpage does not exist in the mapping values of the key value.

When the mapping value defined by the webpage does not exist in the mapping values of the key value, indicating that the television set cannot convert the platform original key value included in the key request into a webpage definition key value defined by the webpage. At this time, the television returns a default mapping value of the webpage in the browser kernel configuration as a required key value of the key request to the webpage, and the default mapping value corresponds to the original key value of the platform included in the key request. When the webpage adopts a key definition standard consistent with the browser, the response can be correctly responded according to the returned default mapping value.

The key value extending method proposed by the present application returns a mapping value identical to a webpage definition key value defined by a webpage to a webpage when the webpage definition key value defined by the webpage exists in the hash mapping table. If the webpage definition key value does not exist in the hash mapping table, the mapping value of the browser kernel configuration is returned to the webpage to achieve returning a correct key value supported by the webpage as much as possible, so that the webpage can response to the key request correctly.

Figure 3:
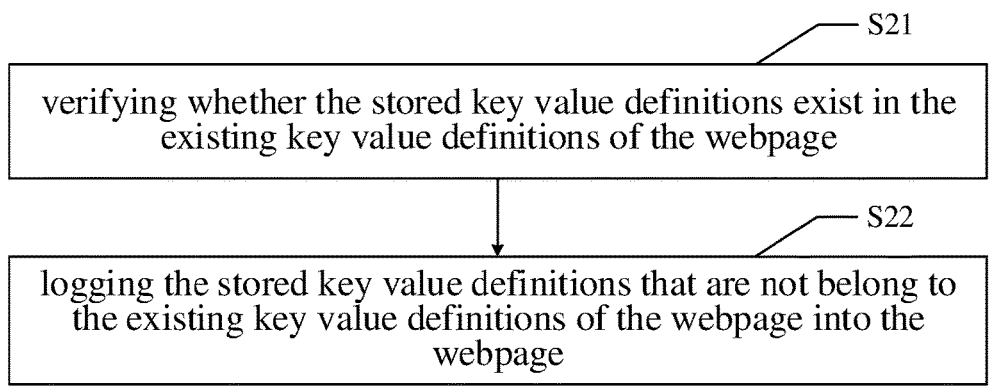
FIG. 3 is a refine flowchart of step S20 in FIG. 1.

Further, a third embodiment of the key value extending method of the present application is proposed based on the second embodiment. In this embodiment, referring to FIG. 3, the foregoing step S20 includes S21 to S22.

In S21, determining whether the stored key value definitions exist in the existing key value definitions of the webpage.

In S22, logging the stored key value definitions that are not belong to the existing key value definitions of the web page into the webpage.

The television compares each of the stored key value definitions with the existing key value definition of the webpage, thereby determining the key values that exist in stored key value definitions but do not exist in the existing key value definition of the webpage, and then inject these determined key value definitions into the webpage to enhance the keys defined by the different key values supported by the webpage.

The key value extending method proposed by this disclosure injecting a key value definition stored in a browser but not included in a webpage into a webpage, thereby enhancing the support of the webpage for different keys.

Figure 4:
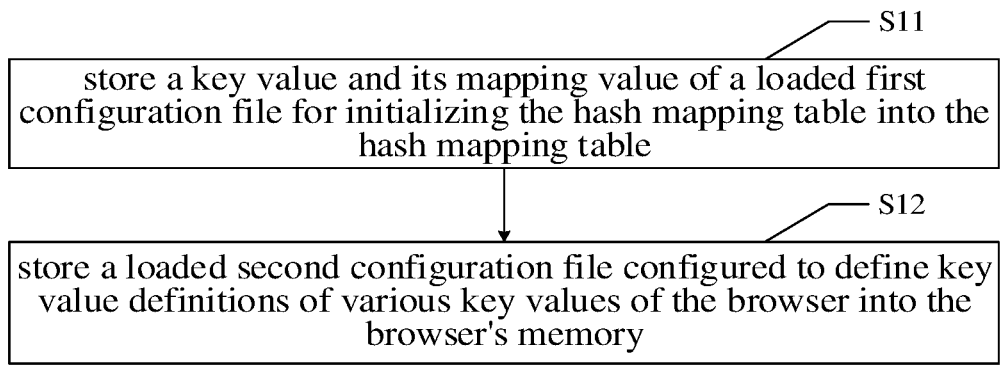
FIG. 4 is a refine flowchart of step S10 in FIG. 1.

Further, a fourth embodiment of the key value extending method of the present application is proposed based on the third embodiment. In this embodiment, referring to FIG. 4, the foregoing step S10 includes S11 to S12.

In S11, storing a key value and its mapping value of a loaded first configuration file for initializing a hash mapping table into the hash mapping table.

In S12, storing a loaded second configuration file used to define a plurality of key value definitions of the browser into the browser's memory.

The first configuration file refers to a file including a platform original key value and a corresponding webpage definition key value thereof, such as the above keymap.ini file; and the second configuration file refers to a file containing various key value definitions to be injected, such as the above key_inject.js file.

When a key to be used by a webpage is a key that is not supported by the browser kernel, it is assumed that the webpage definition key value is 408 for such a key KEYRED, and the platform original key value of the key KEYRED is 110. When the TV detects that the key KEYRED needed by the webpage is not supported by the browser, the television adds the platform original key value of the key KEYRED and the corresponding webpage definition key value of the webpage to the keymap.ini file, and add the key value definition var KEYRED=408 to the key_inject.js file.

The key value extending method proposed by the present application adding a webpage definition key value corresponding to a key and a key value definition required by a webpage into a specified loading file, so that when the browser starts, a hash mapping table and key-value definitions that containing the newly added key are obtained, so that the browser supports newly added keys.

Figure 5:
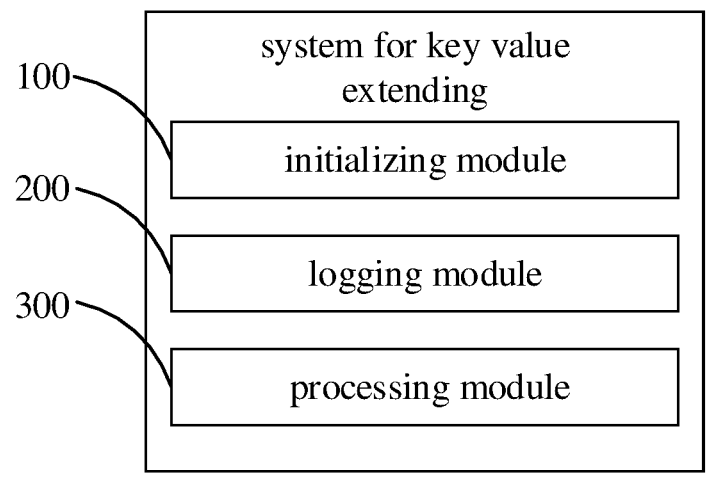
FIG. 5 is a schematic diagram of functional modules of the first embodiment of a system for key value extending in accordance with this disclosure.

The present disclosure further provides a system for key value extending. As shown in FIG. 5, a schematic diagram of functional modules of the first embodiment of a system for key value extending in accordance with this disclosure. And the key value extending system includes following parts.

An initializing module 100, being configured to initialize a hash mapping table according to a specified loading file and store a key value definition to be logged when a browser is started.

The key value extending system can be applied to a television set, and the browser installed on the television is an embedded browser. When the browser on the TV starts up, it needs to load various files, including the file that stores the original key value of the platform and its corresponding webpage definition key value, such as the keymap.ini file, and also includes the injection file, such as the key_inject.js file. The content contained in the injection file is the definition of each key value that needs to be injected.

In this embodiment, the specified load file refers to a keymap.ini file and a key_inject.js file. The initializing module 100 of TV obtains the hash mapping table by initializing the contents of the keymap.ini file and stores the contents of the key_inject.js file on the television. The hash mapping table includes key values and their mapping values, that is, original platform key values of each platform and their mapped webpage definition key values.

An logging module 200, being configured to log a key value definition that stored in the key value definitions but not found in the webpage into the webpage according to the stored key value definitions and existing key value definitions of the webpage, when a webpage is opened;

When a webpage is opened on a browser, the logging module 200 of television obtains the existing key value definitions of the webpage according to the loaded webpage information. A key value definition is determined through comparing the existing key value definition of the webpage with the stored key value definition, and that the key value is not included in the webpage but included in the stored key value definitions. At this time, the logging module 200 injects a key value definition that is not included in the stored webpage value into the webpage, so that the webpage is added some key definitions that are not defined. For example, the key value definition var KEYUP=310 indicates that the key value corresponding to the key KEYUP in the webpage is 310.

A processing module 300, when received a key request from the webpage, searching a mapping value required by the webpage in the hash mapping table according to the key value included in the key request, and returning the searched mapping value to the webpage.

When the processing module 300 of television receives a key request on the webpage sent by a platform (such as a remote controller or a keyboard), the processing module 300 searching the mapping value (i.e., the webpage definition key value) from the hash mapping table corresponding to the key value (i.e. the platform original button value) contained in the key request, and determining a mapping value required by the webpage to return to the webpage, so that the webpage response to the keypress event based on the obtained key mapping value to the platform.

The key value extending system proposed by the present disclosure initializes a hash mapping table according to a specified loading file and stores a key value definition to be injected when the browser is started. When a webpage is opened, logging a key value definition that stored in the key value definitions but not found in the webpage into the webpage, according to the stored key value definitions and existing key value definitions of the webpage. And when received a key request from the webpage, searching a mapping value required by the webpage in the hash mapping table according to the key value included in the key request, and returning the searched mapping value to the webpage. Although different webpages have different key values defined by the same key, the key values supported by the webpage can be obtained without modifying the browser kernel configuration, thereby correctly responding to the key request, and the compatibility of browser key value is improved on different web pages, which avoids the problem of modifying the browser kernel configuration to cause many versions of the browser library.

Figure 6:
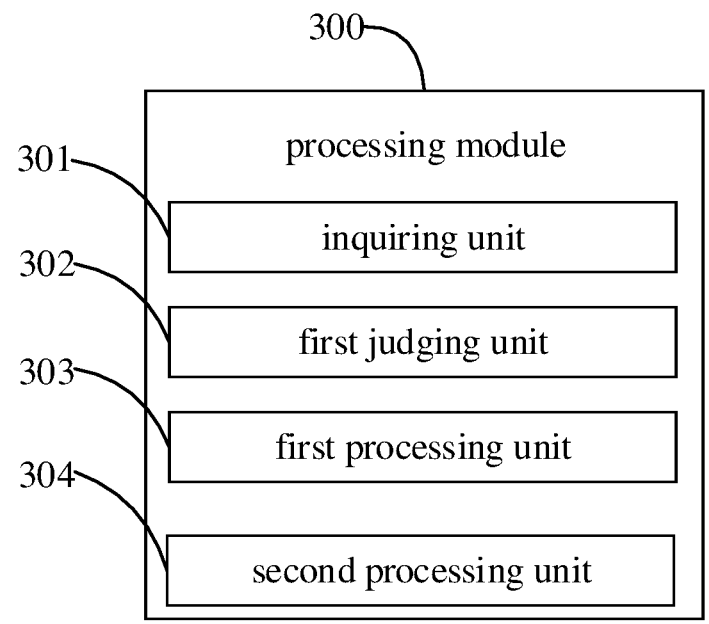
FIG. 6 is a detailed diagram of the processing module of the second embodiment of a system for key value extending in accordance with this disclosure.

Further, a second embodiment of the key value extending system of the present disclosure is proposed based on the first embodiment. Referring to FIG. 6, the foregoing processing module 300 includes following parts.

A determining unit 301, being configured to determine whether the key value exists in the hash mapping table.

The key value refers to a platform original key value included in the key request.

A first judging unit 302, being configured to determine whether the mapping value defined by the webpage exists in the mapping values of the key value if there is a key value exists in the hash mapping table.

The platform original key value for the same key is same. And for different webpages, an original platform key value may be mapped to different webpage definition key values corresponding to different webpages. That is, a key value may have multiple mapping values in the hash mapping table, and these mapping values correspond to webpage definition key values of the same key defined by different webpages.

The first judging unit 302 of television set can obtain the webpage definition key value corresponding to the key value defined by the webpage through the webpage information of the webpage, and then search for the webpage definition key value in mapping values from the hash mapping table, thereby determining whether the mapping value of the webpage definition exists in the mapping value of the key value.

A first processing unit 303, being configured to return the mapping value that defined by the webpage back to the webpage if there is a mapping value defined by the webpage exists in the mapping values of the key value.

If the mapping value defined by the webpage exists in the mapping values of the key value, it indicates that the television can convert the platform original key value included in the key request into a webpage definition key value defined by the webpage. After the first processing unit 303 returns the mapping value defined by the webpage to the webpage, the webpage can respond correctly to the key request according to the returned mapping value. The entire process of receiving a key request from the television to the webpage in response to the web page does not require the television to modify the browser kernel configuration to enable the webpage to support the correct response to the key request.

Further, the processing module 300 further includes:

A second processing unit 304, being configured to return the default mapping value of the key value back to the webpage if there is not a mapping value defined by the webpage exists in the mapping values of the key value.

When the mapping value defined by the webpage does not exist in the mapping values of the key value, indicating that the television set cannot convert the platform original key value included in the key request into a webpage definition key value defined by the webpage. At this time, the second processing unit 304 returns a default mapping value of the webpage in the browser kernel configuration as a required key value of the key request to the webpage, and the default mapping value corresponds to the original key value of the platform included in the key request. When the webpage adopts a key definition standard consistent with the browser, the response can be correctly responded according to the returned default mapping value.

The key value extending method proposed by the present application returns a mapping value identical to a webpage definition key value defined by a webpage to a webpage when the webpage definition key value defined by the webpage exists in the hash mapping table. If the webpage definition key value does not exist in the hash mapping table, the mapping value of the browser kernel configuration is returned to the webpage to achieve returning a correct key value supported by the webpage as much as possible, so that the webpage can response to the key request correctly.

Figure 7:
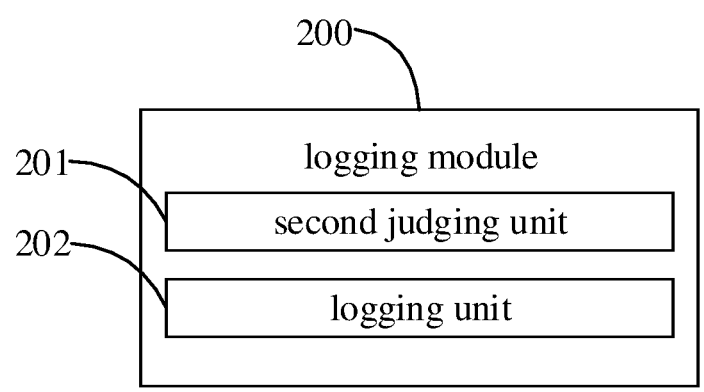
FIG. 7 is a detailed diagram of the logging module of the third embodiment of a system for key value extending in accordance with this disclosure.

Further, a third embodiment of the key value extending method of the present application is proposed based on the second embodiment. In this embodiment, referring to FIG. 7, the logging module 200 includes the following parts.

A second judging unit 201, being configured to determine whether the stored key value definitions exist in the existing key value definitions of the webpage.

A logging unit 202, being configured to log the stored key value definitions that are not belong to the existing key value definitions of the web page into the webpage.

The second judging unit 201 compares each of the stored key value definitions with the existing key value definition of the webpage, thereby determining the key values that exist in stored key value definitions but do not exist in the existing key value definition of the webpage, and then the logging unit 202 inject these determined key value definitions into the webpage to enhance the keys defined by the different key values supported by the webpage.

The key value extending system proposed by this disclosure injecting a key value definition stored in a browser but not included in a webpage into a webpage, thereby enhancing the support of the webpage for different keys.

Figure 8:
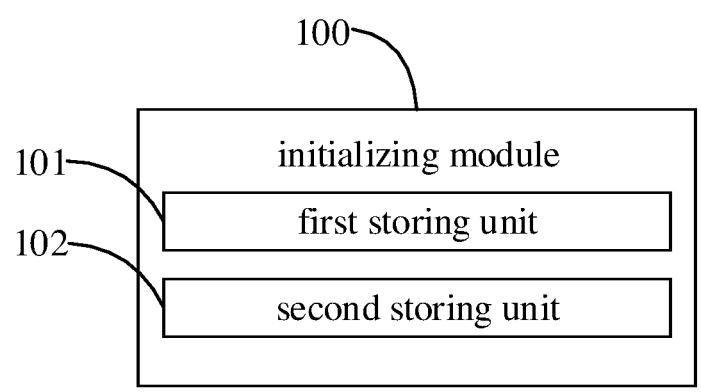
FIG. 8 is a detailed diagram of the initializing module of the fourth embodiment of a system for key value extending in accordance with this disclosure.

Further, a fourth embodiment of the key value extending method of the present application is proposed based on the third embodiment. In this embodiment, referring to FIG. 8, the initializing module 100 includes the following parts.

A first storing unit 101, being configured to store a key value and its mapping value of a loaded first configuration file for initializing a hash mapping table into the hash mapping table.

A second storing unit 102, being configured to store a loaded second configuration file used to define a plurality of key value definitions of the browser keys into the browser's memory.

The first configuration file refers to a file including a platform original key value and a corresponding webpage definition key value thereof, such as the above keymap.ini file; and the second configuration file refers to a file containing various key value definitions to be injected, such as the above key_inject.js file.

When a key to be used by a webpage is a key that is not supported by the browser kernel, it is assumed that the webpage definition key value is 408 for such a key KEYRED, and the platform original key value of the key KEYRED is 110. When the TV detects that the key KEYRED needed by the webpage is not supported by the browser, the television adds the platform original key value of the key KEYRED and the corresponding webpage definition key value of the webpage to the keymap.ini file, and add the key value definition var KEYRED=408 to the key_inject.js file.

The key value extending system proposed by the present application adding a webpage definition key value corresponding to a key and a key value definition required by a webpage into a specified loading file, so that when the browser starts, a hash mapping table and key-value definitions that containing the newly added key are obtained, so that the browser supports newly added keys.

The foregoing description merely portrays some illustrative embodiments according to the disclosure and therefore is not intended to limit the patentable scope of the disclosure. Any equivalent structural or flow transformations that are made taking advantage of the specification and accompanying drawings of the disclosure and any direct or indirect applications thereof in other related technical fields shall all fall in the scope of protection of the disclosure.

What is claimed is:

1. A method for key value extending, wherein the method comprises:
   when a browser is started, storing a key value and its mapping value of a loaded first configuration file for initializing a hash mapping table into the hash mapping table, and storing a loaded second configuration file configured to define key value definitions of various key values of the browser into the browser's memory;
   when a webpage is opened, logging a key value definition that is stored in the key value definitions but not found in the webpage into the webpage, according to the stored key value definitions and existing key value definitions of the webpage; and
   when a key request from the webpage is received, inquiring a mapping value required by the webpage in the hash mapping table according to the key value comprised in the key request, and returning the inquired mapping value to the webpage.

2. The method of claim 1, wherein the operation of inquiring a mapping value required by the webpage in the hash mapping table according to the key value comprised in the key request, and returning the inquired mapping value to the webpage comprises:
   inquiring whether the key value exists in the hash mapping table;
   if yes, determining whether the mapping value defined by the webpage exists in the mapping values of the key value; and
   if yes, returning the mapping value that is defined by the webpage back to the webpage.

3. The method of claim 2, wherein the operation of inquiring a mapping value required by the webpage in the hash mapping table according to the key value comprised in the key request, and returning the inquired mapping value to the webpage further comprises:
   when the mapping value defined by the webpage is not existing in the mapping values of the key value, returning the default mapping value of the key value back to the webpage.

4. The method of claim 1, wherein the operation of logging a key value definition that is stored in the key value definitions but not found in the webpage into the webpage according to the stored key value definitions and existing key value definitions of the webpage, comprises:
   verifying whether the stored key value definitions exist in the existing key value definitions of the webpage; and
   logging the stored key value definitions that are not belong to the existing key value definitions of the webpage into the webpage.

5. A system for key value extending, wherein the system comprises one or more processors and a non-transitory program storage medium storing program code executable by the one or more processors, the program code, when executed by the one or more processors, implements the following operations:
   initializing a hash mapping table according to a specified loading file and store a key value definition needed to be logged when a browser is started; wherein the hash mapping table comprises key value and mapping value thereof;

logging a key value definition that is stored in the key value definitions but not found in the webpage into the webpage according to the stored key value definitions and existing key value definitions of the webpage, when a webpage is opened;

inquiring a mapping value required by the webpage in the hash mapping table according to the key value comprised in the key request, when a key request from the webpage is received, and return the inquired mapping value to the webpage.

6. The system of claim 5, wherein the program code, when executed by the one or more processors, further implements the following operations:

inquiring whether the key value exists in the hash mapping table;

determining whether the mapping value defined by the webpage exists in the mapping values of the key value when the key value exists in the hash mapping table; and returning the mapping value that is defined by the webpage back to the webpage when the mapping value defined by the webpage exists in the mapping values of the key value.

7. The system of claim 6, wherein the program code, when executed by the one or more processors, further implements the following operations:

returning the default mapping value of the key value back to the webpage when there is not a mapping value defined by the webpage existing in the mapping values of the key value.

8. The system of claim 5, wherein the program code, when executed by the one or more processors, further implements the following operations:

verifying whether the stored key value definitions exist in the existing key value definitions of the webpage; and logging the stored key value definitions that are not belong to the existing key value definitions of the webpage into the webpage.

9. The system of claim 5, wherein the program code, when executed by the one or more processors, further implements the following operations:

storing a key value and its mapping value of a loaded first configuration file for initializing the hash mapping table into the hash mapping table; and storing a loaded second configuration file configured to define key value definitions of various key values of the browser into the browser's memory.

10. The system of claim 6, wherein the program code, when executed by the one or more processors, further implements the following operations:

storing a key value and its mapping value of a loaded first configuration file for initializing the hash mapping table into the hash mapping table; and storing a loaded second configuration file configured to define key value definitions of various key values of the browser into the browser's memory.

11. The system of claim 7, wherein the program code, when executed by the one or more processors, further implements the following operations:

storing a key value and its mapping value of a loaded first configuration file for initializing the hash mapping table into the hash mapping table; and storing a loaded second configuration file configured to define key value definitions of various key values of the browser into the browser's memory.

12. The system of claim 8, wherein the program code, when executed by the one or more processors, further implements the following operations:

storing a key value and its mapping value of a loaded first configuration file for initializing the hash mapping table into the hash mapping table; and storing a loaded second configuration file configured to define key value definitions of various key values of the browser into the browser's memory.

13. A television configured with a system for key value extending, wherein the system comprises one or more processors and a non-transitory program storage medium storing program code executable by the one or more processors, the program code, when executed by the one or more processors, implements the following operations:

initializing a hash mapping table according to a specified loading file and store a key value definition needed to be logged when a browser is started; wherein the hash mapping table comprises key value and mapping value thereof;

logging a key value definition that is stored in the key value definitions but not found in the webpage into the webpage according to the stored key value definitions and existing key value definitions of the webpage, when a webpage is opened;

inquiring a mapping value required by the webpage in the hash mapping table according to the key value comprised in the key request, when a key request from the webpage is received, and returning the inquired mapping value to the webpage.

* * * * *